May 14, 1968     L. E. SPOERLEIN     3,382,679
JET ENGINE WITH VAPORIZED LIQUID FEEDBACK
Filed March 28, 1966
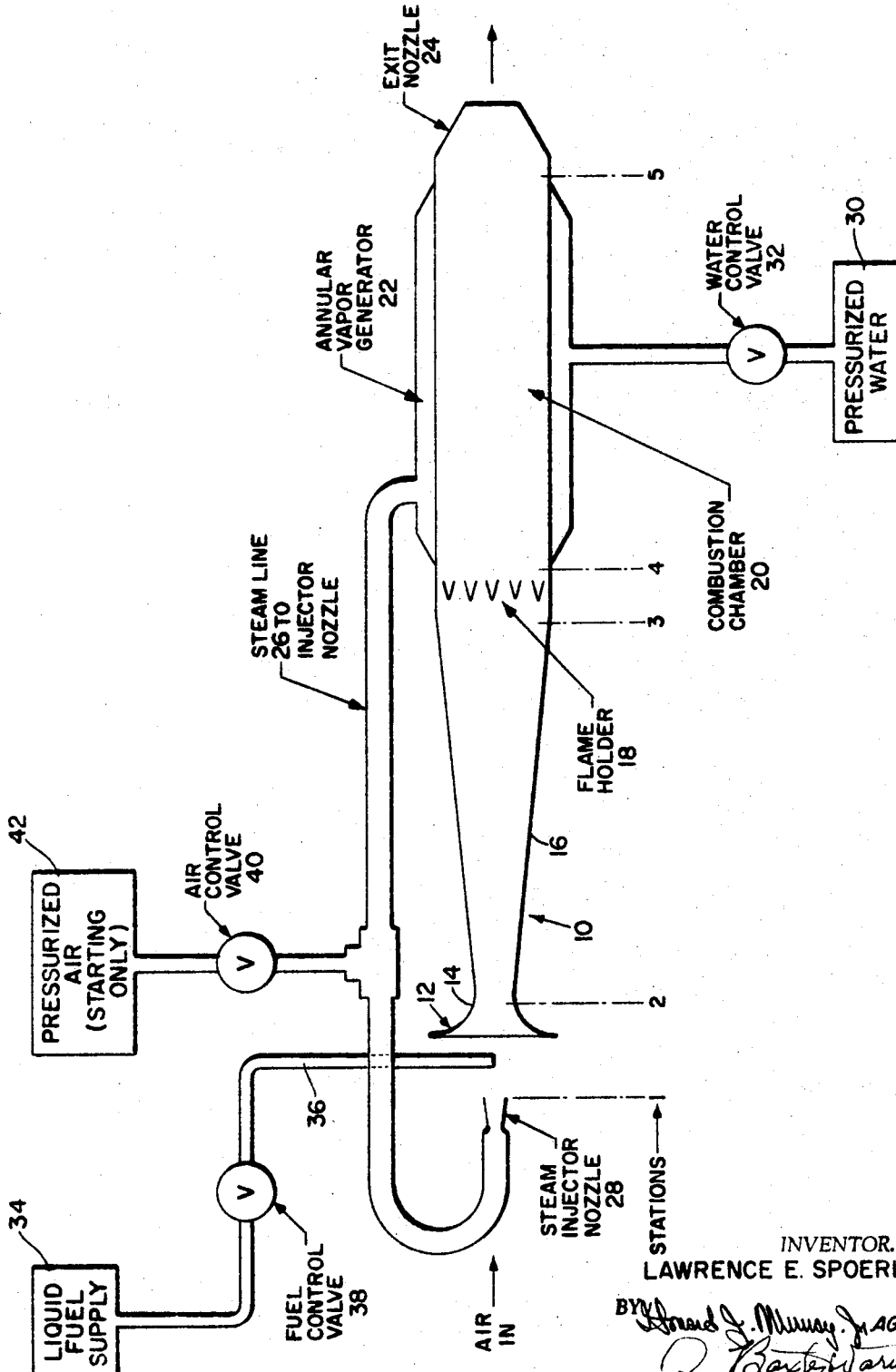
INVENTOR.
LAWRENCE E. SPOERLEIN

United States Patent Office 3,382,679
Patented May 14, 1968

3,382,679
JET ENGINE WITH VAPORIZED LIQUID FEEDBACK
Lawrence E. Spoerlein, 672 E. Joyce Drive,
Port Hueneme, Calif. 93041
Filed Mar. 28, 1966, Ser. No. 538,921
1 Claim. (Cl. 60—267)

The invention described herein may be manufactured and used by or for the Government of the United States of America for governmental purposes without the payment of any royalties thereon or therefor.

The present invention relates to an injection-induction air-breathing jet engine, of the constant-burning type, that is capable of producing static thrust with no moving parts.

A majority of the jet engines now in use employ a portion of the developed power to drive a compressor. Inasmuch as the latter must rotate at extremely high speed, it requires extensive maintanence and must be periodically inspected and overhauled. Apart from the high cost of manufacture of such an engine, its complexity results in a limited operational life in comparison with the vehicle of which the engine forms a part.

There is a recognized need for a simple and reliable jet engine which possesses no moving parts. The only device of this character which is now available is the socalled ram-jet engine, but this is not suitable for many aircraft operations inasmuch as it requires an initial buildup of high ram inlet air pressure. Other types of propulsion, such as rockets, are inherently unsuitable for employment on vehicles which must be highly manoeuverable within a wide speed range.

The present invention has as one of its objectives the provision of an air-breathing jet engine which is capable of developing a high output thrust and which at the same time possesses no components which undergo physical displacement with respect to one another. Basically, the engine of the present concept is of the injection type, utilizing the energy in a high-velocity jet to yield a motivating force for the working fluid passing through the engine. The fundamental sequence of a thermodynamic gas power cycle (that is, (1) compression, (2) release of energy, and (3) expansion) is accomplished by employing the energy of a high-velocity jet to compress a mixture of air and fuel through a momentum-transfer process. Compression is followed by combustion of the fuel to release energy and then by expansion of the products of combustion. A basic feature of the concept resides in the arrangement of the components so as to permit the extraction of a portion of the energy released during combustion to generate the high-velocity gas on a continuous-cycle basis. In a preferred embodiment, a liquid is vaporized in a jacket surrounding the combustion chamber of the engine, and this vapor, under high pressure, is fed back to mix with air and fuel which then passes into the diffuser section of the engine.

One object of the present invention, therefore, is to provide an improved form of air-breathing jet engine utilizing no moving parts.

Another object of the present invention is to provide a jet engine of the injection-induction type in which a portion of the developed energy is employed to vaporize a liquid, with this vapor then being fed back to the engine inlet where it is mixed with air and fuel in controlled proportions.

A further object of the present invention is to provide an injection-induction jet engine which possesses a high operating efficiency on the basis of pounds of thrust produced per pound of fluid flow through the engine.

A still further object of the invention is to provide an air-breathing jet engine which is light in weight and simple in construction, and which can operate over extended periods of time with little or no maintenance or repair.

Other objects, advantages, and novel features of the invention will become apparent from the following detailed description of the invention when considered in conjunction with the accompanying drawing, the single figure of which is a diagrammatic presentation of an injection-induction jet engine designed in accordance with a preferred embodiment of the present invention.

Referring now to the drawing, there is illustrated a jet engine embodying the principles of the present concept. This engine, generally identified by the reference numeral 10, includes an air intake nozzle 12 having a throat portion 14 of restricted diameter. The throat portion 14 leads to a diffuser section 16, at the far end of which is located a flame holder 18. Rearwardly of the latter is the engine combustion chamber 20, and, surrounding this combustion chamber 20, is an annular vapor generator unit 22 disposed as shown in the drawing. At the rear of the combustion chamber is the usual exit or exhaust nozzle 24.

It is a characteristic of applicant's invention that a portion of the energy developed in the combustion chamber 20 in the form of heat is utilized to produce vapor in the generator unit 22, and in the following description, it will be assumed that this vapor is in the form of steam. A pipe or conduit 26 conducts the steam generated in the unit 22 to a location proximate the inlet 12 of engine 10, where the steam is ejected from the line 26 through a nozzle 28.

In order to permit the generation of vapor in the unit 22, water (or other liquid) is supplied to the annular jacket 22 from a pressurized source 30 through a control valve 32. The steam ejected from nozzle 28 is mixed with liquid fuel from a source 34 which emerges from a tube 36 the end of which lies intermediate the steam ejector nozzle 28 and the inlet nozzle 12 of the engine 10, as illustrated in the drawing. A valve 38 controls the amount of fuel emerging from tube 36 in order to achieve optimum operating efficiency of the engine 10.

In describing the operation of applicant's improved jet engine, it is necessary to recognize the conditions which exist at various portions of the assembly during operation. To facilitate such a description, a number of regions of the engine have been set forth in the drawing, these regions being designated as "stations" 1 thru 5. Such stations will be referred to hereinafter.

Initially, let it be assumed that the engine illustrated in the drawing is in operation, and that a liquid (such as water) is being supplied from the pressurized source 30 through the valve 32 to the annular jacket 22 which surrounds the engine combustion chamber 20. This results in the development of a highly pressurized vapor in the generator 22, and this pressurized vapor passes through the conduit 26 to be ejected through the nozzle 28.

The jet of vapor thus ejected from nozzle 28 mixes with air in a region designated as station #1 in the drawing, and part of the energy in the vapor jet is imparted to the air by momentum transfer. The mixture of vapor and air passes over the end of the fuel tube 36 where the emerging fuel is aspirated into the mixture, since the static pressure at the fuel jet is less than ambient pressure. The resulting mixture of vapor, air and fuel then passes through the engine intake nozzle 12 and throat 14 (station #2) and into the diffuser section 16, where the kinetic energy of the mixture is converted to pressure through a deceleration process.

The decelerated mixture (at station #3 of the drawing) then passes over the flame holder 18, where the air and fuel ignite and release energy through combustion. These hot products of combustion in the chamber 20 transfer heat through the wall of the chamber to the vapor generator 22 to vaporize the liquid which has been fed thereinto from the source 30. The products of combustion in the chamber 20 then pass through the exit nozzle 24 where they are expanded and exhausted to the atmosphere and thereby produce the required thrust. The vaporized liquid in the jacket 22 passes at high pressure through the conduit 26 to nozzle 28 to complete the operating cycle of the engine 10.

Although the source 30 has been illustrated and described as containing a liquid under pressure, it is contemplated that a small amount of the vapor (such as steam) produced in unit 22 may be utilized to pump liquid from an unpressurized source. This can be accomplished through the employment of a vapor jet liquid pump incorporated into the conduit leading from the source 30 to the vapor generator 22. However, this is an expedient the use of which is optional and dependent upon the particular requirements under which the engine 10 is required to operate.

Upon certain circumstances, it may be desirable to introduce air under pressure into the conduit 26 in order to initiate operation of the engine. This can readily be accomplished by manual control of a valve 40 to admit such pressurized air from a source 42. A pressure of 50 lbs. per square inch is normally adequate. A suitable ignitor (such as a spark plug, for example) may be utilized adjacent the flame holder 18, but since such igniting means is entirely conventional it has not been illustrated in the drawing in the interest of simplicity. Once operation of the engine 10 begins it is self-sustaining, and merely requires a proper setting of the control valves 32 and 38.

The high level of operating efficiency of the engine herein disclosed will be apparent from the following discussion of a complete performance cycle:

SYMBOLS AND ABBREVIATIONS $A_e$—Exit area of exit nozzle (square inches).
$A_{en}$—Exit area of injector nozzle (square inches).
$A_t$—Area of injector nozzle throat (square inches).
$A_1$—Internal heat transfer area in vapor generator (square inches).
$A_2$—Average of internal heat transfer area in vapor generation (square inches).
$A_3$—External heat transfer area in vapor generator (square inches).
B.t.u.—British thermal units of heat.
$C_P$—Specific heat at constant pressure (B.t.u. per pound per degree Fahrenheit).
$\bar{C}_P$—Specific heat at constant pressure for a mixture (B.t.u. per pound per degree Fahrenheit).
$D_e$—Diameter of exit area of exit nozzle (inches).
$D_{en}$—Diameter of injector nozzle exit area (inches).
$D_t$—Diameter of injector nozzle throat area (inches).
F—Thrust (pounds).
° F.—Temperature (degrees Fahrenheit).
ft.—Length (feet).
$g$—Gravitational constant (feet per second per second).
$h$—Enthalpy (B.t.u. per pound).
$h_1$—Internal film coefficient of heat transfer (B.t.u. per hour per square foot per degree Fahrenheit).
$h_2$—External film coefficient of heat transfer (B.t.u. per hour per square foot per degree Fahrenheit).
in.—Length (inches).
J—Mechanical equivalent of heat (foot-pound per B.t.u.).
K—Thermal conductivity of the material of heat transfer wall (B.t.u. per hour per foot per degree Fahrenheit).
$k$—Ratio of specific heat at constant pressure to specific heat at constant volume.
L—Length of vapor generator heat transfer area (inches).
lb.—pound, force or mass.
$\bar{M}$—Average molecular weight of a mixture (pounds).
$P_a$—Ambient pressure (pounds per square inch absolute).
$P_e$—Pressure at the exit of the exit nozzle (pounds per square inch absolute).
$P_3$—Pressure at the entrance to the flame holder (pounds per square inch absolute).
$P_5$—Pressure at the entrance to the exit nozzle (pounds per square inch absolute).
p.s.i.a.—Pressure (pounds per square inch absolute).
p.s.i.g.—Pressure (pounds per square inch gage).
$\dot{Q}$—Heat release rate by fuel (B.t.u. per second).
$q$—Heat transfer rate in vapor generator (B.t.u. per hour).
$\bar{\rho}$—Average density of hot gas mixture in vapor generator (pounds per cubic foot).
$\Sigma R_t$—Thermal resistance to heat transfer in vapor generator (hour-degree Fahrenheit per B.t.u.).
$\bar{R}$—Average gas constant for the mixture in the engine (foot pounds per pound per degree Rankine or degree Fahrenheit).
° R.—Temperature (degrees Rankine).
sec.—Time (seconds).
$T_a$—Ambient temperature (degrees Rankine).
$T_e$—Temperature of exhaust at exit of exit nozzle (degrees Rankine).
$T_5$—Temperature at entrance to exit nozzle degrees Rankine).
$t$—Thickness of heat transfer wall (feet).
$V_{en}$—Volume flow rate at injector nozzle exit (cubic feet per second).
$V_t$—Volume flow rate at throat of injector nozzle (cubic feet per second).
$v_e$—Exit velocity from exit nozzle (feet per second).
$v_{en}$—Exit velocity from injector nozzle (feet per second).
$v_t$—Velocity at injector nozzle throat (feet per second).
$\bar{v}$—Average velocity of hot gas mixture through the vapor generator (feet per second).
$\dot{w}_a$—Air flow rate (pounds per second).
$\dot{w}_F$—Fuel flow rate (pounds per second).
$\dot{w}_t$—Total flowrate (pounds per second).
$\dot{w}_v$—Vapor flow rate (pounds per second).
$\Delta h_{a3}$—Change in enthalpy of air from ambient to entrance to flame holder (B.t.u. per pound).
$\Delta h_{v3}$—Change in enthalpy of vapor from the vapor generator to the entrance of the flame holder (B.t.u. per pound).
$\Delta T$—Change in temperature (degrees Fahrenheit).
$\eta_i$—Efficiency of injector.
$\rho_e$—Density of exhaust products at exit of exit nozzle (pounds per cubic foot).

With all fluids through the engine being accelerated from rest and expanded to ambient pressure through the exit nozzle (that is, $P_e = P_a$) the thrust is a function of exit velocity. Thus, $$F = \frac{v_e}{g} \cdot \dot{w}_t$$

The exit velocity is determined from the conservation of energy equation $$V_e = \left\{ 2gJC_pT_t\left[ 1 - \left(\frac{P_a}{P_5}\right)^{\frac{K-1}{k}} \right] \right\}^{\frac{1}{2}} \quad (2)$$

where $P_5$ and $T_5$ are total values. Substitution of Equation 2 into Equation 1 gives the following expression for thrust $$F = \left\{ \frac{2JC_pT_5}{g}\left[ 1 - \left(\frac{P_a}{P_5}\right)^{\frac{K-1}{k}} \right] \right\}^{\frac{1}{2}} \cdot \dot{w}_t \quad (3)$$

Assuming that the pressure change from station 3 to station 5 is negligible, the $P_a/P_5$ is equal to $P_a/P_3$, which is a function of the enthalpy of the vapor which injects the air into the engine. The velocity at station 3 is low enough to be neglected and since the amount of fuel induced is relatively small compared with the other injected fluids, its change in enthalpy will be disregarded. Thus, the change in enthalpy of the vapor from the vapor generator to station 3 is equal to the change in enthalpy of the induced air from ambient to station 3. That part of the enthalpy rise of induced air which is due to pressure rise may be expressed as $$\eta_i \Delta h_{v3} \dot{w}_v = \Delta h_{a3} \dot{w}_a \qquad (4)$$

and $$\Delta h_{a3} = C_p T_a \left[ \left(\frac{P_3}{P_a}\right)^{\frac{K-1}{k}} - 1 \right] \qquad (5)$$

where $\eta_i$ is the efficiency of the injection.

Rearrangement of the terms in Equation 4 and substitution into Equation 5 produces the following relationships:

$$\Delta h_{a3} = \eta_i \Delta h_{v3} \frac{\dot{w}_v}{\dot{w}_a}$$

$$\eta_i \Delta h_{v3} \frac{\dot{w}_v}{\dot{w}_a} = C_p T_a \left[ \left(\frac{P_3}{P_a}\right)^{\frac{K-1}{k}} - 1 \right]$$

$$\left(\frac{P_3}{P_a}\right)^{\frac{K-1}{k}} = 1 + \frac{\eta_i \Delta h_{v3}}{C_p T_a} \frac{\dot{w}_v}{\dot{w}_a}$$

$$\left(\frac{P_a}{P_3}\right)^{\frac{K-1}{k}} = \frac{C_p T_a \dot{w}_a}{C_r T_a \dot{w}_a + \eta_i \Delta h_{v3} \dot{w}_v}$$

It was previously assumed that $P_5$ is equal to $P_3$. Thus, substitution of Equation 6 into Equation 3 gives the following expressions for thrust:

$$F = \left[ \frac{2JC_p T_5}{g} \left( 1 - \frac{C_p T_a \dot{w}_a}{C_p T_a \dot{w}_a + \eta_i \Delta h_{v3} \dot{w}_v} \right) \right]^{1/2} \dot{w}_t$$

$$F = \left[ \frac{2JC_p T_5}{g} \left( \frac{\eta_i \Delta h_{v3} \dot{w}_v}{C_p T_a \dot{w}_a + \eta_i \Delta h_{v3} \dot{w}_v} \right) \right]^{1/2} \dot{w}_t \qquad (7)$$

From Equation 7, it may be seen that for a given ambient condition and injector efficiency, the thrust produced per pound per second of flow through the engine is a function of the characteristics of the vapor used to induce as the fuel. The energy required to inject liquid into the vapor used determine the optimum $\dot{w}_a/\dot{w}_v$ ratio, $T_5$, $C_p$ and the $\Delta h_{v3}$ available.

In order to gain an understanding of the performance of the injection-induction engine of the present invention a cycle calculation for the engine in its simplest form will be given. This engine utilizes one stage of compression, relatively low pressure steam as the vapor, and kerosene as the fuel. The energy required to inject liquid into the vapor generator will be neglected. For the cycle calculation, the steam injector and inlet section of the system is assumed to be operating according to the performance graph for a jet injector acting as a blower. The operating point is selected by assuming that combustion of kerosene can be maintained in an atmosphere that is 17 percent water vapor by weight.

For an injector operating at the selected air-to-vapor ratio with an 80 p.s.i.g. steam supply, the following performance values are valid, as set forth in "Kent's Mechanical Engineer's Handbook," 12th ed., John Wiley, New York, 1954:

Steam flow rate _____ pound per second__ 0.0243
Air flow rate _____do____ 0.120
Discharge pressure _____p.s.i.a__ 22.24

Since the quantity of fuel entrained as well as the amount of liquid water is relatively small, it may be neglected in the following calculations of the thermodynamic characteristics of the mixture:

Average specific heat at constant pressure:

$\overline{C}_p$ = fraction of vapor $\times C_p$ of vapor + fraction of air $\times C_p$ of air $$\overline{C}_p = 0.17 \times 0.5 + 0.83 \times 0.247 = 0.29 \frac{\text{B.t.u.}}{\text{lb. °F.}}$$

Average molecular weight:

$\overline{M}$ = fraction of vapor $\times$ molecular weight of vapor + fraction of air $\times$ molecular weight of air $\overline{M} = 0.17 \times 18 + 0.83 \times 29 = 27.1$ Gas constant for the mixture:

$$R = \frac{\text{(universal gas constant)}}{\overline{M}}$$

$$R = \frac{1544}{27.1} = 57.0 \frac{\text{ft.-lb.}}{\text{lb. °F.}}$$

or $$\frac{57.0}{778} = 0.073 \frac{\text{B.t.u.}}{\text{lb. °F.}}$$

Specific heat ratio for the mixture:

$$k = \frac{\overline{C}_p}{\overline{C}_p - \overline{R}}$$

$$k = \frac{0.29}{0.29 - 0.073} = 1.34$$

The following characteristics may be assumed for kerosene, as set forth in "Applied Thermodynamics," by Norris et al., 3rd ed., McGraw-Hill, New York, 1955.

Lower heating value = 18,485 B.t.u. per pound
Theoretical air-to-fuel ratio = 14.33

Thus, the fuel flow rate would be $$\dot{w}_F + \frac{\text{air flow rate}}{\text{air-to-fuel ratio}}$$

$$\dot{w}_F = \frac{0.120}{14.33} = 0.00837 \text{ pound per second}$$

The temperature of the compressed mixture, at station 3 of the drawing, is the saturation temperature of the mixture at the pressure at that station, which is given as 235° F. ("Thermodynamic Properties of Steam," 1st ed., by Keenan & Keyes, New York, John Wiley, 1946). The total flow rate through the engine is as follows:

Air _____ 0.120
Steam _____ 0.0243
Fuel _____ 0.00837

Total flow rate $\dot{w}_t = 0.15267$ or 0.153 pound per second.

Since combustion efficiency and pressure losses through the engine may be influenced by component geometry, complete combustion of the fuel and no pressure loss through the engine is assumed.

The heat released by combustion as the mixture passes over the flame holder from station 3 to station 4 is:

$\dot{Q} = 0.00837 \times 18,485 = 155$ B.t.u. per second (assuming 100 percent combustion).

The temperature rise of the mixture as a result of the combustion may be expressed as $$\Delta T = \frac{\dot{Q}}{\dot{w}_t \overline{C}_P} \qquad \Delta T = \frac{155}{0.153 \times 0.29} = 3,500° \text{ F.}$$

Thus, the resulting temperature is the temperature at station 3 plus the temperature rise from combustion, or 3,500 + 235 = 3,735° F. In passing through the vapor generator from station 4 to station 5, heat is removed from the mixture at a rate sufficient to produce steam at the required rate. With the water entering the vapor generator at 60° F., and leaving as saturated steam at 80 p.s.i.g., the change in enthalpy is:

Enthalpy of saturated steam at 80 p.s.i.g. is 1,186 B.t.u. per pound; enthalpy of liquid water at 60° F. is 28 B.t.u. per pound.

Change in enthalpy equals 1,186 − 28 = 1,158 B.t.u. per pound.

Thus, the mixture in passing through the generator section from station 4 to station 5 yields 1,158×0.0243= 28.14 B.t.u. per pound. The transfer of heat from the mixture produces a drop in temperature of the mixture as shown by the relation $$\Delta T = -\frac{\text{heat removed}}{\bar{w}_t \bar{C}_P}$$

or $$\Delta T = -\frac{28.14}{0.153 \times 0.29} = 634° \text{ F.}$$

Thus, the temperature of the mixture flowing through the engine as it leaves the vapor generator and enters the exit nozzle at station 5 is 3,735−634=3,101° F. or 3,101+460=3,561° R.

The state of the mixture at the entrance of exit nozzle, station 5, is pressure (assuming no loss through the engine) 22.25 p.s.i.a., temperature, 3,561° R. Expanding the mixture through the exit nozzle to standard ambient pressure produces thrust per pound of flow through the engine per second as expressed by Equation 3. Substituting the above values into Equation 3 gives the thrust per pound of flow through the engine per second as $$\frac{F}{\bar{w}_t} = \left\{ \frac{2 \times 778 \times 0.29 \times 3,561}{32.2} \left[ 1 - \left(\frac{14.7}{22.25}\right)^{\frac{1.34-1}{1.34}} \right] \right\}^{1/2}$$

$$\frac{F}{\bar{w}_t} = 71.1$$

pounds of thrust per pound of flow through the engine per second. Thus, the thrust produced by the engine is:

$$F = 71.1 \times 0.153 = 10.9 \text{ pounds of thrust}$$

Although no attempt will be made to set forth an optimum overall size for the engine herein described, nevertheless exemplary dimensions for the various components thereof will be given below in order to emphasize the manner in which size and weight requirements may be reduced to a minimum.

Assuming that the velocity of the steam passing through the conduit 26 is 100 ft. per second (or less) in order to minimize pressure losses, a desirable diameter for such conduit 26 may be in the order of ½ inch. Since the steam expands isentropically through the nozzle 28, it may be further assumed that the static pressure at the throat of this nozzle is 58% of the total pressure, or 55.9 p.s.i.a. The velocity at the throat of nozzle 28 is 1,488 ft. per second, and the volume flow through the throat (neglecting the volume of the liquid), is .1813 cubic feet per second. The required throat area $A_t$ is .0134 square inch, with a throat diameter $D_t$ of .131 inch. To determine the exit dimensions for the steam injector nozzle 28, it may be assumed that the steam expands isentropically from a 94.7 p.s.i.a. vapor generator pressure to 14.7 p.s.i.a. at the exit nozzle 28. The velocity of the steam at this exit nozzle 28 is 2,620 feet per second, with a volume flow of .585 cubic feet per second. Consequently, the required exit area $A_{en}$ is .0322 sq. inch, with an exit diameter $D_{en}$ of .203 inch. The diameter of the throat 14 (station #2) is equal to 1.01 inches, and the cross-sectional area of the missile 10 in the region of the flame holder 18 is 2.57 sq. inches with a diameter of 1.81 inches.

The average temperature through the vapor generator 22 (representing the average between the entrance and exit temperatures) is 3,418° F. The average velocity through the vapor generator is 485 ft. per second. The heat transfer rate between the combustion chamber 20 and the vapor generator 22 is 28.14 B.t.u. per second. The internal area of heat transfer required for proper operation is consequently 98.5 sq. inches. If the diameter of the combustion chamber be assumed to be 2 inches (instead of 1.81 inches) the required chamber length in order to yield the necessary heat transfer is approximately 15.7 inches.

If the nozzle 24 possesses a convergence half-angle of 30 degrees, the required exit area is .834 square inch, assuming a temperature at the exit of 3,205° F., an exit density of the mixture of .0116 pound per cubic foot, and an exit velocity of 2,280 feet per second. Consequently, the exit diameter of the nozzle is 1.03 inches.

It has been found in practice that high combustion temperatures produce violent boiling of the liquid in the vapor generator 22. This results in the production of a considerable quantity of water in the steam, which, upon passing into the engine through the nozzle 28, is liable to produce a flame-out. Under certain circumstances, therefore, it is desirable to introduce a liquid separator into the steam system, this liquid separator consisting of a stilling chamber which causes the liquid to settle out of the steam and thereby permits an increase in steam generation rate without flame-out.

The separation distance between the steam injector nozzle 28 and the inlet nozzle 12 of engine 10 may be varied within reasonable limits. Tests have indicated that the performance of the engine does not greatly change as the distance is varied between one and two inches. However, as the distance is decreased to less than one inch, there is a tendency towards flame-out, apparently due to lack of sufficient air to support combustion. As the distance is increased beyond 2 inches, combustion instability and burning ahead of the flame holder 18 occurs, thus indicating a low velocity through the engine.

Although high efficiency is achieved on steam alone in the manner above described, it may be possible under certain conditions to augment the steam supply by the addition of compressed air from the source 42 even during operation of the engine. However, such an expedient is entirely optional, and depends upon the severity of the demands placed upon the equipment.

Obviously many modifications and variations of the present invention are possible in the light of the above teachings. It is therefore to be understood that within the scope of the appended claim the invention may be practiced otherwise than as specifically described.

I claim:
1. In a jet engine for a vehicle designed for flight above the surface of the earth, said engine having disposed in sequence along the longitudinal axis thereof an air inlet nozzle, a diffuser section, a combustion chamber, and an exhaust nozzle through which pass the products of combustion, the improvement which comprises:
   a vapor generator associated with said combustion chamber and energized by the reception of heat therefrom;
   a source of pressurized liquid to be vaporized;
   means for conducting liquid from said source to said generator to vaporize such liquid;
   a conduit for conducting vapor from said generator to a point lying along the longitudinal axis of said engine and between one and two inches outside the said inlet nozzle thereof;
   means for forming the vapor emerging from said conduit into a jet and for directing the jet so formed along the longitudinal axis of said engine and into the said inlet nozzle;
   a source of fuel in liquid form;
   means for conducting liquid fuel from said source to a point intermediate said vapor forming means and said engine inlet nozzle and for emitting such liquid fuel into the vapor jet present in such region;
   such emitted liquid fuel being introduced into said vapor jet prior to the entry of such vapor into the inlet nozzle of said engine to raise the pressure in said combustion chamber and thereby increase the amount of energy made available to produce flight of said vehicle;
   a source of air under pressure; and
   means for controllably admitting air from said source into the conduit through which vapor is conducted from said generator to a point outside the said engine inlet nozzle in order to initiate operation of said jet engine.

References Cited
UNITED STATES PATENTS

| | | | |
|---|---|---|---|
| 324,828 | 8/1885 | Gassett | 60—39.49 |
| 1,261,940 | 4/1918 | Johnson | 60—39.05 |
| 1,874,314 | 8/1932 | Lasley | 60—39.49 X |
| 2,558,483 | 6/1951 | Goddard | 60—39.49 X |
| 2,663,142 | 12/1953 | Wilson | 60—269 X |
| 2,795,105 | 6/1957 | Porter | 60—39.49 X |
| 2,968,152 | 1/1961 | Moore | 60—39.49 X |

FOREIGN PATENTS

| | | |
|---|---|---|
| 705,003 | 3/1931 | France. |
| 1,027,266 | 2/1953 | France. |

CARLTON R. CROYLE, *Primary Examiner.*

SAMUEL FEINBERG, *Examiner.*